United States Patent [19]

Sakaguchi

[11] Patent Number: 5,328,138
[45] Date of Patent: Jul. 12, 1994

[54] FISHING REEL WITH ONE-WAY CLUTCH

[75] Inventor: Noboru Sakaguchi, Tondabayashi, Japan

[73] Assignee: Shimano Inc., Osaka, Japan

[21] Appl. No.: 22,866

[22] Filed: Mar. 1, 1993

Related U.S. Application Data

[63] Continuation of Ser. No. 707,089, May 29, 1991, abandoned.

[30] Foreign Application Priority Data

Jun. 20, 1990 [JP] Japan ................. 2-65263[U]

[51] Int. Cl.$^5$ ................................ A01K 89/033
[52] U.S. Cl. ............................ 242/300; 242/261
[58] Field of Search ................... 242/297–300, 242/257, 260, 261, 262

[56] References Cited

U.S. PATENT DOCUMENTS

| | | | |
|---|---|---|---|
| 1,073,728 | 9/1913 | Atwood | 242/298 |
| 1,434,626 | 11/1922 | Parka | 242/298 X |
| 2,690,310 | 9/1954 | Hayes | 242/298 X |
| 3,027,114 | 3/1962 | Grieten | 242/298 X |
| 4,049,217 | 9/1977 | Koopman | 242/298 X |
| 4,422,600 | 12/1983 | Preston | 242/298 X |
| 4,964,590 | 10/1990 | Sato | 242/261 |
| 5,020,738 | 6/1991 | Yamaguchi | 242/298 |

FOREIGN PATENT DOCUMENTS 42-7523  4/1942  Japan .
58-52092  11/1983  Japan .

Primary Examiner—Daniel P. Stodola
Assistant Examiner—Michael R. Mansen
Attorney, Agent, or Firm—Dickstein, Shapiro & Morin

[57] ABSTRACT

A fishing reel includes a reel body, a rotary member supported by the reel body and rotatable for taking up a fishing line, a transmission mechanism for transmitting drive to the rotary member in a direction for taking up the fishing line, and a one-way clutch mounted between the rotary member and the reel body for preventing the rotary member from rotating in a direction for feeding the fishing line. The one-way clutch is a roller type or ball-type.

8 Claims, 2 Drawing Sheets 5,328,138

FISHING REEL WITH ONE-WAY CLUTCH

This application is a continuation of application Ser. No. 07/707,089 filed May 29, 1991, now abandoned.

BACKGROUND OF THE INVENTION

1. Field of the Invention

The present invention relates to a fishing reel comprising a rotary member supported by a reel body and rotatable to take up a fishing line, and a transmission gear mechanism for transmitting drive to the rotary member in a direction for taking up the fishing line. More particularly, the invention relates to the technique of preventing rotation of the rotary member in a direction for feeding out the fishing line.

2. Description of the Related Art

An example of the conventional two-bearing reels as structured above is provided with a one-way clutch having a ratchet wheel or the like mounted on a handle shaft connected to a handle for taking up the fishing line. A tensile force applied to the fishing line produces a power to rotate the rotary member (spool) in the direction for feeding out the fishing line, which power is in turn transmitted to the handle shaft through the transmission gear mechanism. As a result, the one-way clutch prevents rotation of the rotary member.

With such a reel, rotation of the rotary member in the line feeding direction is prevented through the transmission gear mechanism, which tends to mar the transmission mechanism, e.g. when a fish gives a strong pull at the end of the filing line or the angler pulls the line with a great force and applies the great force to the transmission mechanism as well.

SUMMARY OF THE INVENTION

A primary object of the present invention is to provide an improved fishing reel constructed to have less chance of damaging the transmission mechanism driving the rotary member in the direction for taking up the fishing line even when a great force is applied to the transmission mechanism for rotating the rotary member in the line feeding direction.

In order to achieve the above-noted object, a fishing reel according to the present invention is characterized by a roller type or ball type one-way clutch mounted between the rotary member and the reel body for locking the rotary member against rotation in the direction for feeding out the fishing line.

This construction has the following functions and effects.

As shown in FIGS. 1 through 3, when a rotational force is applied to the rotary member 2 in the direction for feeding out the fishing line, the one-way clutch D transmits the rotational force to the reel body A thereby to prevent rotation of the rotary member.

Such a structure considerably reduces clattering compared with the conventional structure employing a ratchet wheel.

More particularly, rotation of the rotary member 2 is prevented between the rotary member 2 and the reel body A, which does not exert any force on the transmission mechanism C and does not cause any play on the spool when the rotation is prevented.

Thus, the present invention can realize a fishing reel which does not mar the transmission mechanism even when a great force is applied thereto to rotate the rotary member in the feeding direction and which prevents rotation of the rotary member not through any intermediate transmission mechanism but directly from the reel body thereby to reliably and steadily prevent rotation of the rotary member.

Other objects, features and advantages of the invention will be apparent from the following description referring to the drawings.

BRIEF DESCRIPTION OF THE DRAWINGS

The drawings show a fishing reel embodying the present invention, in which.

DETAILED DESCRIPTION OF THE PREFERRED EMBODIMENTS

The present invention will be described in detail referring to the accompanying drawings.

Figure 1:
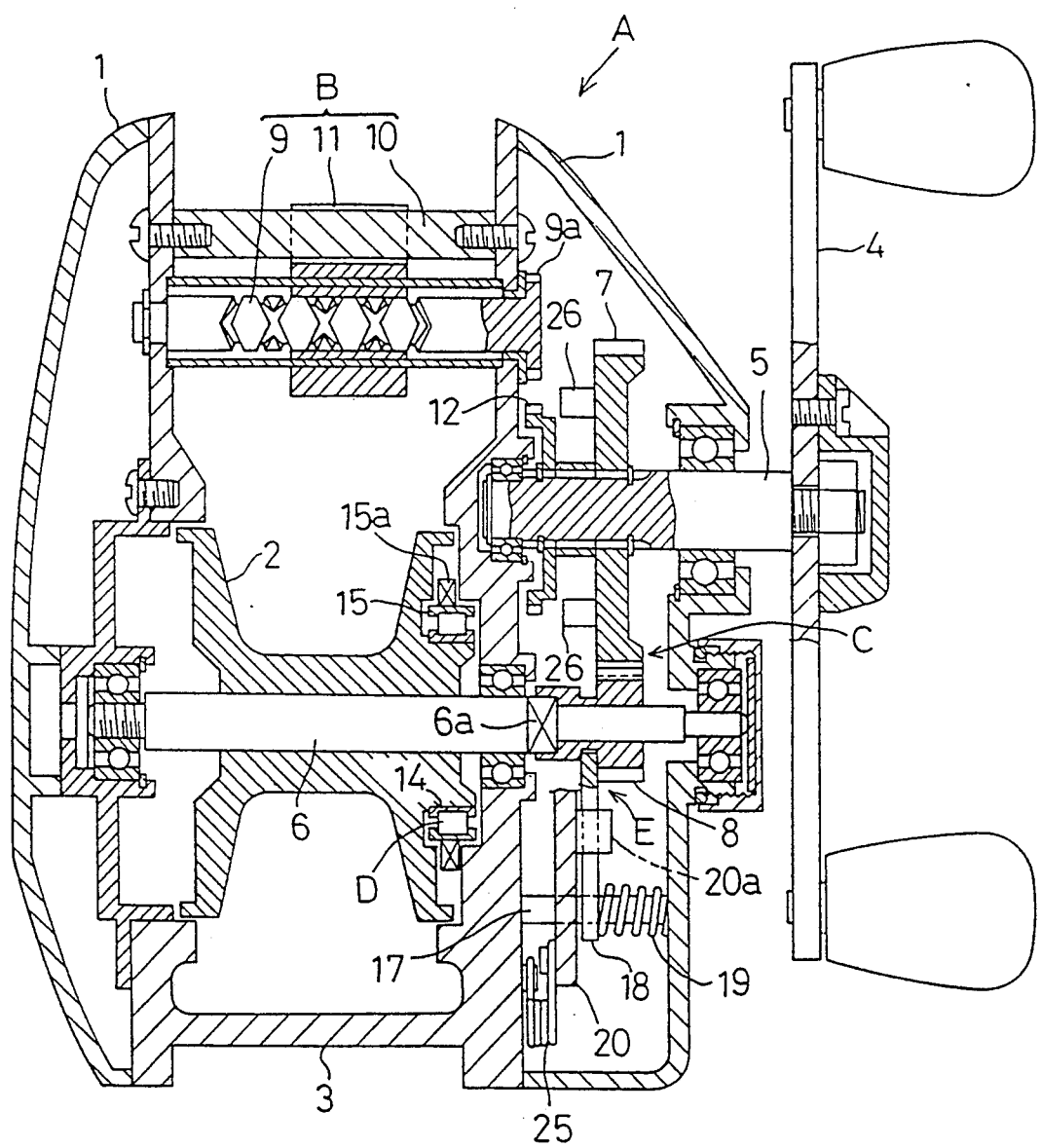
FIG. 1 is a cross-sectional plan view of the fishing reel.
Figure 2:
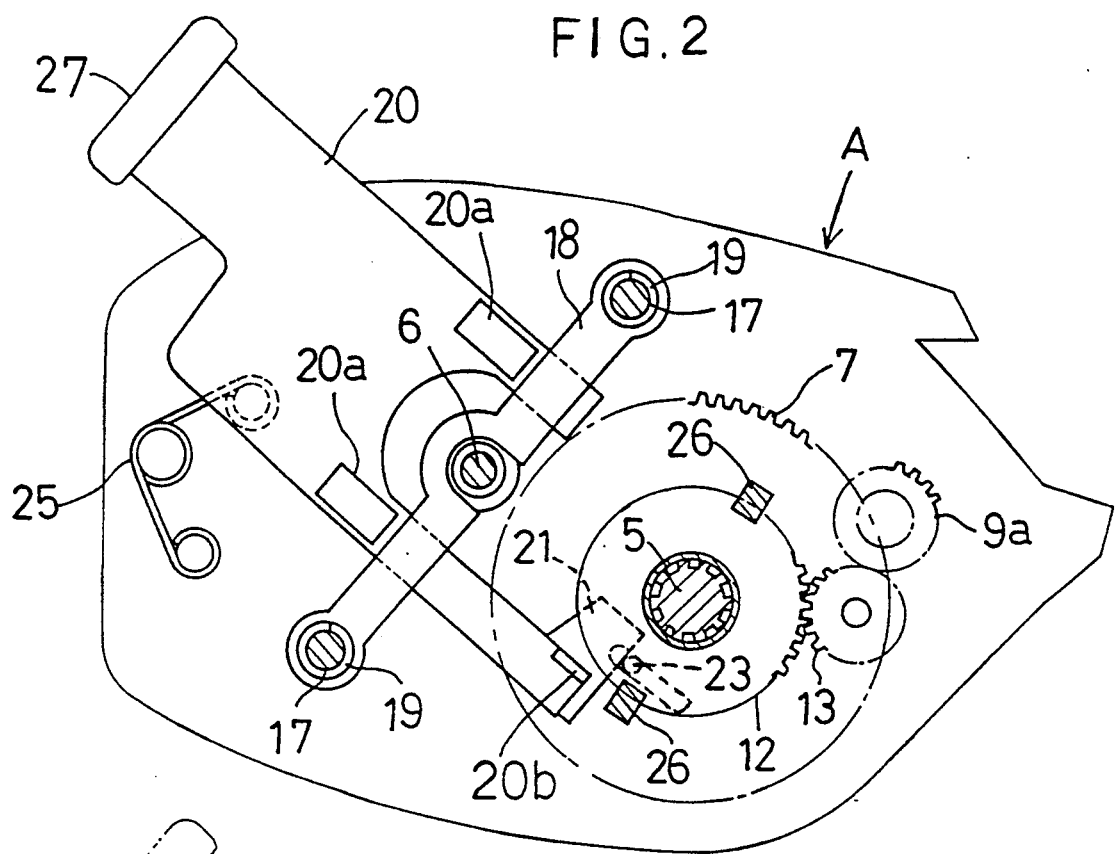
FIG. 2 is a side view of a clutch control system.
Figure 3:
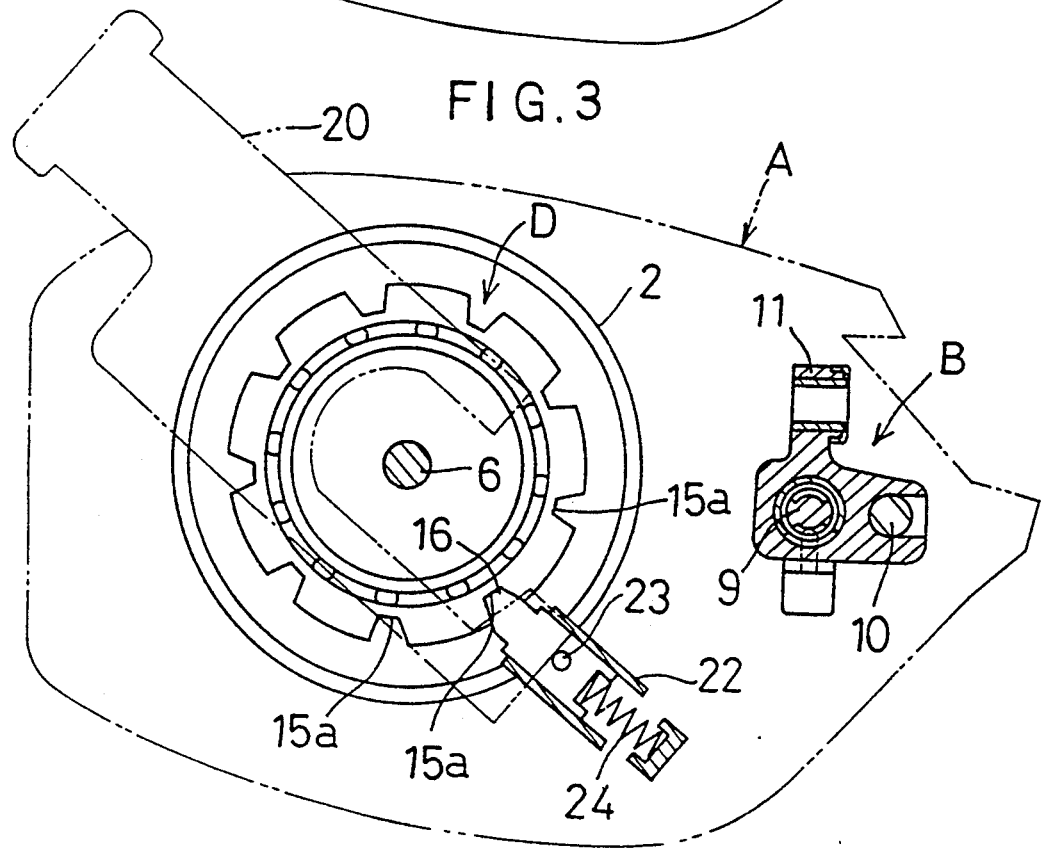
FIG. 3 is a side view of a control system of a one-way clutch.

FIGS. 1 through 3 show a two-bearing reel embodying the present invention and comprising a reel body A, and right and left side cases 1 forming the reel body. The reel further comprises a level wind mechanism B, a spool 2 acting as a rotary member, and a thumb rest 3, all of which are mounted between the side cases. A transmission mechanism C includes a handle shaft 5 with a handle 4 supported by the right side case 1, and a drive gear 7 and a pinion gear 8 mounted between the handle shaft 5 and a spool shaft 6 rotatable in unison with the spool 2.

As seen from the drawings, the level wind mechanism B reciprocates a fishing line guide member 11 along a guide rod 10 with rotation of a traverse shaft 9. In the level wind mechanism B, an output gear 12 mounted on the handle shaft 5 transmits drive to an input gear 9a mounted on the traverse shaft 9 through an intermediate gear 13.

The pinion gear 8 is shiftably and loosely fitted on the spool shaft 6. With a shifting operation, an inward end face of the pinion gear 8 is engaged with a mating portion 6a of the spool shaft 6 thereby to transmit the drive power from the handle shaft 5 to the spool 2. The pinion gear 8 also acts as a clutch E disengageable from the mating portion 6a to break the power transmission.

With this reel, when a tensile force is applied to a fishing line (not shown) taken up to the spool 2 to rotate the spool 2 in a direction for feeding out the fishing line, a roller type one-way clutch D having a plurality of rollers between an inner race and an outer race and mounted between the spool and the right side case 1 forcibly prevents the spool 2 from rotating.

The one-way clutch D is secured to the spool 2 at the inner race 14 thereof, and prevents rotation of the spool by engagement between an engaging element 16 and one of a plurality of engaged portions 15a defined in the outer race 15 as shown in FIG. 3. Disengagement therebetween allows the spool to be freely rotatable. A switch-over structure thereof will be set forth below.

The pinion gear 8 is engaged with a shifter 18 slidably supported by a pair of shafts 17 parallel to the spool shaft 6. An urging force from coil springs 19 fitted on the shafts 17 is applied to the shifter 18 for engaging the pinion gear 8 with the spool shaft 6 thereby to engage the clutch E.

A control plate 20 is slidably mounted on the right side case 1, which defines cam faces 20a operable in a direction for disengaging the pinion gear 8 from the spool shaft 6. The control plate 20 is provided with a control element 21.

The engaging element 16 having a control pin 23 is retractably supported by a guide member 22 and is urged to the engaged portions 15a by a spring 24. The control element 21 moves into contact with the control pin 23 when the control plate 20 is operated to disengage the clutch E thereby to move the engaging element 16 away from the engaged portions 15a.

A toggle spring 25 acts upon the control plate 20 to maintain the control plate 20 in either of a clutching position and a declutching position. An end portion 20b of the control plate 20 is positioned within a locus of revolution of contact elements 26 projecting from a side face of the drive gear 7 in the declutching position. When the handle 4 is rotated in a take-up direction with the clutch E being disengaged, the contact elements 26 push back the control plate 20 to the clutching position.

With the structure of the two-bearing reel according to the present invention as noted above, the one-way clutch D forcibly prevents the spool 2 from rotating if a strong tensile force is applied to the fishing line. When the fishing line is fed in a casting action or the like, a knob 27 associated with the control plate 20 is pressed thereby to break the connection between the spool shaft 6 and the transmission mechanism C and at the same time cancel the function of the one-way clutch mechanism D. As a result, the spool 2 becomes rotatable in the direction for feeding the fishing line.

Apart from the foregoing embodiment, the one-way clutch may be the ball type employing balls instead of the rollers.

The reel may also be a single bearing type.

What is claimed is:

1. A fishing reel comprising:
    a reel body;
    a spool supported by said reel body and rotatable for taking up a fishing line;
    a transmission mechanism including a handle shaft, a spool shaft rotatable in unison with said spool, a drive gear, and a pinion gear for transmitting drive to said spool in a direction for taking up a fishing line; and
    a one-way clutch including an inner race, an outer race, a plurality of rollers located between said inner and outer races, a plurality of engaged portions mounted on said outer race, and an engaging element mounted on said reel body;
    said inner race being secured to said spool,
    said engaging element being urged toward the engaged portions by an elastic member,
    wherein said one-way clutch is not mounted on any member of said transmission mechanism, said one-way clutch is operable to engage said engaging element mounted on the reel body with said engaged portion to completely prevent rotation of said outer race, thereby preventing said spool from rotating in a fishing line feed-out direction.

2. A fishing reel as claimed in claim 1 wherein said engaging element includes a control pin for moving the engaging element away from the engaged portions.

3. A fishing reel as claimed in claim 2 wherein said engaging element is moved away from the engaged portions by contact between the control pin and a control element defined in a control plate for breaking power transmission from the handle shaft to the rotary member.

4. A fishing reel as claimed in claim 3 wherein said control plate is acted upon by a toggle spring thereby to be maintained in a position for establishing or breaking power transmission from the handle shaft to the rotary member.

5. A fishing reel as claimed in claim 4 wherein said control plate includes an end portion positioned within a locus of revolution of contact elements projecting from a side face of the drive gear when the control plate is maintained in a position for breaking power transmission from the handle shaft to the rotary member, said contact elements pushing back the control plate to the position for establishing power transmission from the handle shaft to the rotary member when the handle is rotated in a take-up direction.

6. A fishing reel as claimed in claim 2, further comprising a control plate having a control element, said control plate being arranged to selectively allow and prevent power transmission from said handle shaft to said spool, and wherein the movement of said engaging element away from said engaged portions is caused by contact between said control pin and said control element.

7. A fishing reel comprising:
    a reel body;
    a spool supported by the reel body and rotatable for taking up a fishing line and including a projecting portion projecting from one outer lateral face to the spool;
    a transmission mechanism including a handle shaft, a spool shaft rotatable in unison with said spool, a drive gear, and a pinion gear for transmitting drive to said spool in a direction for taking up the fishing line; and
    a one-way clutch including an inner race, an outer race, a plurality of rollers located between said inner and outer races, a plurality of engaged portions mounted on said outer race, and an engaging element mounted on said reel body;
    said inner race being secured to said projecting portion of said spool,
    said engaging element being urged toward the engaged portions by an elastic member,
    wherein said one-way clutch is not mounted on any member of said transmission mechanism, said one-way clutch is operable to engage said engaging element mounted on the reel body with said engaged portion to completely prevent rotation of said outer race, thereby preventing said spool from rotating in a fishing line feed-out direction.

8. A fishing reel comprising:
    a reel body;
    a spool supported by the reel body and rotatable for taking up a fishing line and including a projecting portion projecting from one outer lateral face of the spool;
    a transmission mechanism including a handle shaft, a spool shaft rotatable in unison with said spool, a drive gear, and a pinion gear for transmitting drive to said rotary member in a direction for taking up the fishing line, a one-way clutch including an inner race, an outer race, a plurality of rollers located between said inner and outer races, a plurality of engaged portions mounted on said outer race, and an engaging element mounted on said reel body;
    said inner race being secured to said projecting portion of said spool;

said engaging element being urged toward the engaged portions by an elastic member;

said engaging element including a control pin for moving the engaging element away from the engaged portions;

the fishing reel further comprising a control plate having a control element, said clutch being switchable, in response to an operation of said control plate, between a clutched condition for transmitting force from said handle shaft to said spool and an un-clutched condition for breaking the force transmission;

wherein said one-way clutch is not mounted on any member of said transmission mechanism;

said one-way clutch being operable such that when said control plate is operated for switching said clutch to said clutched condition, said one-way clutch engages said engaging element mounted on the reel body with said engaged portion to completely prevent rotation of said outer race, thereby preventing said spool from rotating in a fishing line feed-out direction, said one-way clutch being operable such that when said control plate is operated for switching said clutch to said un-clutched condition, said one-way clutch disengages said engaging element from said engaged portion as said control element comes into contact with said control pin, thereby to render said outer race and said spool freely rotatable.

* * * * *